(12) United States Patent
Ropke et al.

(10) Patent No.: US 12,206,936 B2
(45) Date of Patent: *Jan. 21, 2025

(54) USE OF STEGANOGRAPHICALLY-ENCODED TIME INFORMATION AS BASIS TO CONTROL IMPLEMENTATION OF DYNAMIC CONTENT MODIFICATION

(71) Applicant: The Nielsen Company (US), LLC, New York, NY (US)

(72) Inventors: Benjamin J. Ropke, Rochelle, NY (US); Shashank C. Merchant, Sunnyvale, CA (US); John S. Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,476

(22) Filed: Nov. 20, 2023

(65) Prior Publication Data
US 2024/0107115 A1 Mar. 28, 2024

Related U.S. Application Data

(63) Continuation of application No. 18/159,628, filed on Jan. 25, 2023, now Pat. No. 11,863,817, which is a
(Continued)

(51) Int. Cl.
*H04N 21/44* (2011.01)
*G06T 1/00* (2006.01)
(Continued)

(52) U.S. Cl.
CPC ..... *H04N 21/44016* (2013.01); *G06T 1/0085* (2013.01); *H04N 21/23892* (2013.01);
(Continued)

(58) Field of Classification Search
CPC ............ G06T 1/0085; H04N 21/23892; H04N 21/2402; H04N 21/44016;
(Continued)

(56) References Cited

U.S. PATENT DOCUMENTS 6,570,996 B1 * 5/2003 Linnartz ............ H04N 1/00002
725/20
6,889,325 B1 * 5/2005 Sipman ................. H04L 63/126
380/37
(Continued)

OTHER PUBLICATIONS

International Preliminary Report on Patentability from International Application No. PCT/US2020/037924, dated Dec. 28, 2021.

*Primary Examiner* — Michael B. Pierorazio
(74) *Attorney, Agent, or Firm* — McDonnell Boehnen Hulbert & Berghoff LLP

(57) ABSTRACT

A method and system for controlling implementation of dynamic content modification. The disclosure provides for using at least one steganographically-encoded timestamp in a media stream transmitted to a media client as a basis to determine a transmission delay for media-stream transmission to the media client, and for providing the determined transmission delay as a basis to facilitate control over whether to have the media client implement dynamic content modification. In addition, the disclosure provides for receiving respectively from each of various media clients a report indicating transmission delay determined for the media client based on such steganographically-encoded timestamp data, and using the transmission delays for the media clients to establish a dynamic-content-modification footprint that could be used to control whether, where, and to what extent dynamic content modification will be applied.

20 Claims, 9 Drawing Sheets

Related U.S. Application Data continuation of application No. 17/643,944, filed on Dec. 13, 2021, now Pat. No. 11,589,109, which is a continuation of application No. 16/836,449, filed on Mar. 31, 2020, now Pat. No. 11,234,049, which is a continuation-in-part of application No. 15/929,220, filed on Feb. 6, 2020, now Pat. No. 11,051,057.

(60) Provisional application No. 62/882,247, filed on Aug. 2, 2019, provisional application No. 62/865,607, filed on Jun. 24, 2019.

(51) Int. Cl.
*H04N 21/2389* (2011.01)
*H04N 21/24* (2011.01)
*H04N 21/81* (2011.01)
*H04N 21/8547* (2011.01)

(52) U.S. Cl.
CPC ....... *H04N 21/2402* (2013.01); *H04N 21/812* (2013.01); *H04N 21/8547* (2013.01)

(58) Field of Classification Search
CPC ......... H04N 21/44209; H04N 21/6582; H04N 21/812; H04N 21/8358; H04N 21/8547
See application file for complete search history.

(56) References Cited

U.S. PATENT DOCUMENTS

| | | | | |
|---|---|---|---|---|
| 8,190,435 B2* | 5/2012 | Li-Chun Wang | ..... | G06F 16/683 704/270 |
| 8,290,423 B2* | 10/2012 | Wang | ..... | H04B 17/23 455/2.01 |
| 8,650,603 B2* | 2/2014 | Doets | ..... | H04N 21/25891 725/38 |
| 8,688,600 B2* | 4/2014 | Barton | ..... | G06Q 30/0601 84/603 |
| 8,725,829 B2* | 5/2014 | Wang | ..... | G11B 27/28 704/239 |
| 8,811,885 B2* | 8/2014 | Wang | ..... | H04H 60/44 455/2.01 |
| 2002/0072982 A1* | 6/2002 | Barton | ..... | G06Q 30/0625 705/14.1 |
| 2002/0083060 A1* | 6/2002 | Wang | ..... | G11B 27/28 |
| 2004/0199387 A1* | 10/2004 | Wang | ..... | G10L 15/26 704/E15.045 |
| 2005/0028195 A1* | 2/2005 | Feinleib | ..... | H04N 7/163 725/135 |
| 2005/0091274 A1* | 4/2005 | Stanford | ..... | G06F 16/9577 |
| 2005/0192863 A1* | 9/2005 | Mohan | ..... | G06Q 30/02 705/14.27 |
| 2005/0209917 A1* | 9/2005 | Anderson | ..... | G06Q 30/0214 705/14.16 |
| 2006/0195359 A1* | 8/2006 | Robinson | ..... | G06Q 30/0236 705/14.19 |
| 2006/0224452 A1* | 10/2006 | Ng | ..... | G06Q 30/0242 705/14.27 |
| 2006/0256133 A1* | 11/2006 | Rosenberg | ..... | G06F 3/013 345/619 |
| 2007/0124756 A1* | 5/2007 | Covell | ..... | G06F 16/635 348/E7.071 |
| 2007/0130580 A1* | 6/2007 | Covell | ..... | G11B 27/034 725/18 |
| 2007/0143778 A1* | 6/2007 | Covell | ..... | H04N 21/8133 725/135 |
| 2007/0179850 A1* | 8/2007 | Ganjon | ..... | G06Q 30/00 705/14.27 |
| 2007/0192784 A1* | 8/2007 | Postrel | ..... | H04N 21/4316 725/23 |
| 2007/0214049 A1* | 9/2007 | Postrel | ..... | H04N 21/475 725/32 |
| 2008/0052062 A1* | 2/2008 | Stanford | ..... | G10L 15/26 704/E15.045 |
| 2009/0158318 A1 | 6/2009 | Levy | | |
| 2009/0198701 A1* | 8/2009 | Haileselassie | ..... | G06F 16/9535 |
| 2009/0217052 A1* | 8/2009 | Baudry | ..... | G06T 1/0085 713/178 |
| 2009/0313670 A1* | 12/2009 | Takao | ..... | H04N 21/47 725/110 |
| 2010/0034466 A1* | 2/2010 | Jing | ..... | G06F 18/214 382/195 |
| 2010/0114713 A1* | 5/2010 | Anderson | ..... | G06Q 20/10 705/14.69 |
| 2011/0273455 A1* | 11/2011 | Powar | ..... | G11B 27/10 345/473 |
| 2012/0011545 A1* | 1/2012 | Doets | ..... | H04N 21/8153 725/38 |
| 2012/0076310 A1* | 3/2012 | DeBusk | ..... | G10L 25/48 381/56 |
| 2012/0117596 A1* | 5/2012 | Mountain | ..... | H04N 21/4147 725/39 |
| 2012/0124608 A1* | 5/2012 | Postrel | ..... | G06Q 30/0215 725/23 |
| 2012/0191231 A1* | 7/2012 | Wang | ..... | G06F 16/7834 700/94 |
| 2012/0221131 A1* | 8/2012 | Wang | ..... | G06F 16/683 700/94 |
| 2012/0295560 A1* | 11/2012 | Mufti | ..... | H04B 13/00 455/95 |
| 2012/0297400 A1* | 11/2012 | Hill | ..... | G06F 9/445 719/318 |
| 2012/0316969 A1* | 12/2012 | Metcalf, III | ..... | G06Q 30/0269 705/14.66 |
| 2012/0317240 A1* | 12/2012 | Wang | ..... | H04H 60/37 709/219 |
| 2013/0010204 A1* | 1/2013 | Wang | ..... | H04B 17/23 348/725 |
| 2013/0029762 A1* | 1/2013 | Klappert | ..... | A63F 13/792 463/31 |
| 2013/0031579 A1* | 1/2013 | Klappert | ..... | H04N 21/812 725/32 |
| 2013/0042262 A1* | 2/2013 | Riethmueller | ... | H04N 21/25866 725/14 |
| 2013/0044051 A1* | 2/2013 | Jeong | ..... | H04N 21/42222 345/156 |
| 2013/0067512 A1* | 3/2013 | Dion | ..... | H04N 7/17318 725/32 |
| 2013/0073366 A1* | 3/2013 | Heath | ..... | G06Q 30/0261 705/14.25 |
| 2013/0073377 A1* | 3/2013 | Heath | ..... | G06Q 30/02 705/14.39 |
| 2013/0080242 A1* | 3/2013 | Alhadeff | ..... | G06F 16/957 705/14.39 |
| 2013/0080262 A1* | 3/2013 | Scott | ..... | G06Q 30/02 705/14.68 |
| 2013/0083859 A1 | 4/2013 | Nemiroff et al. | | |
| 2013/0085828 A1* | 4/2013 | Schuster | ..... | G06Q 30/0207 705/14.39 |
| 2013/0111519 A1* | 5/2013 | Rice | ..... | G06Q 30/02 725/34 |
| 2013/0124073 A1* | 5/2013 | Ren | ..... | G08G 1/00 701/118 |
| 2013/0194496 A1* | 8/2013 | Atherton | ..... | H04N 21/242 348/E9.034 |
| 2013/0297815 A1* | 11/2013 | Ma | ..... | H04L 67/62 709/231 |
| 2014/0086446 A1* | 3/2014 | Han | ..... | H04N 9/8211 382/100 |
| 2014/0137139 A1* | 5/2014 | Jones | ..... | H04N 21/458 725/18 |
| 2014/0214532 A1* | 7/2014 | Barton | ..... | G06Q 30/0251 705/26.62 |
| 2014/0278845 A1* | 9/2014 | Teiser | ..... | H04N 21/812 705/14.4 |
| 2014/0282671 A1* | 9/2014 | McMillan | ..... | H04N 21/44008 725/19 |

(56) References Cited

U.S. PATENT DOCUMENTS

| | | | | |
|---|---|---|---|---|
| 2015/0052571 | A1* | 2/2015 | Stokking | H04N 21/8547 725/116 |
| 2015/0128180 | A1* | 5/2015 | Mountain | H04N 21/64322 725/39 |
| 2015/0229979 | A1* | 8/2015 | Wood | H04N 21/4663 725/14 |
| 2015/0237389 | A1* | 8/2015 | Grouf | H04N 21/4532 725/49 |
| 2015/0312601 | A1* | 10/2015 | Novotny | H04N 21/64769 725/117 |
| 2015/0334257 | A1* | 11/2015 | Woods | H04N 1/00307 348/207.1 |
| 2016/0057490 | A1* | 2/2016 | Besehanic | H04H 60/31 725/19 |
| 2016/0127793 | A1* | 5/2016 | Grouf | H04N 21/47 725/46 |
| 2016/0165287 | A1* | 6/2016 | Wood | H04N 21/44222 725/14 |
| 2016/0182973 | A1* | 6/2016 | Winograd | H04N 21/8358 725/25 |
| 2016/0316261 | A1 | 10/2016 | Koshevoy | |
| 2016/0323650 | A1* | 11/2016 | Grouf | H04N 21/435 |
| 2016/0345074 | A1 | 11/2016 | Serbest et al. | |
| 2017/0078727 | A1* | 3/2017 | Wood | H04N 21/44222 |
| 2017/0280176 | A1 | 9/2017 | Gordon | |
| 2017/0324995 | A1* | 11/2017 | Grouf | H04N 21/4788 |
| 2018/0262805 | A1* | 9/2018 | Grouf | H04N 21/47 |
| 2019/0058929 | A1* | 2/2019 | Young | H04N 21/235 |
| 2019/0149874 | A1* | 5/2019 | Lau | H04N 21/26233 725/74 |
| 2020/0275141 | A1* | 8/2020 | Merchant | H04N 21/23418 |
| 2020/0275168 | A1* | 8/2020 | Merchant | H04N 21/8358 |
| 2020/0404366 | A1* | 12/2020 | Ropke | G06T 1/0085 |

* cited by examiner

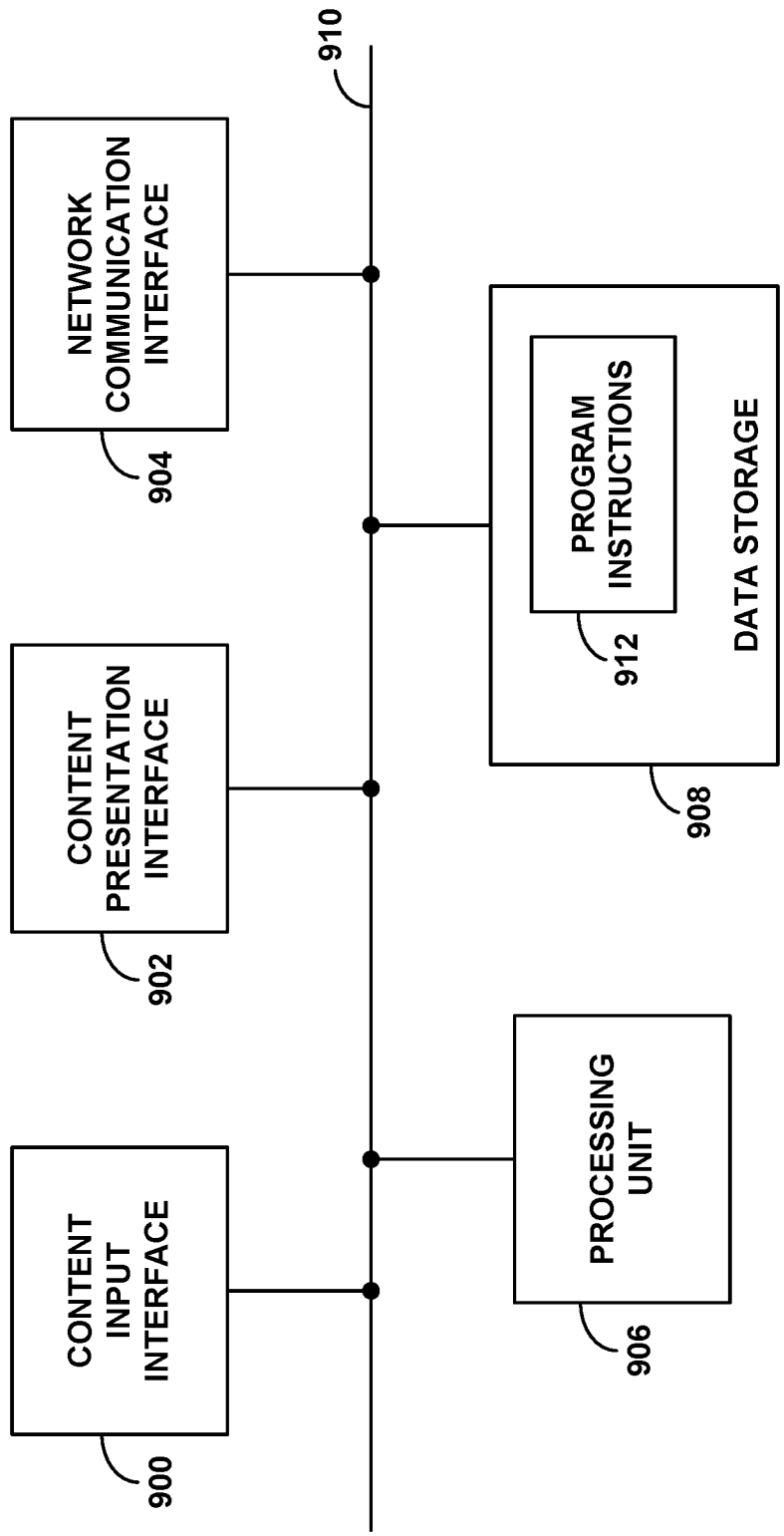

USE OF STEGANOGRAPHICALLY-ENCODED TIME INFORMATION AS BASIS TO CONTROL IMPLEMENTATION OF DYNAMIC CONTENT MODIFICATION

REFERENCE TO RELATED APPLICATION

This is a continuation of U.S. patent application Ser. No. 18/159,628, filed Jan. 25, 2023, which is a continuation of U.S. patent application Ser. No. 17/643,944, filed Dec. 13, 2021, which is a continuation of U.S. patent application Ser. No. 16/836,449, filed Mar. 31, 2020, which is a continuation-in-part of U.S. patent application Ser. No. 15/929,220, filed Feb. 6, 2020, the entirety of each of which is hereby incorporated by reference. U.S. patent application Ser. No. 16/836,449 also claims priority to U.S. Provisional Patent Application No. 62/865,607, filed Jun. 24, 2019, and to U.S. Provisional Patent Application No. 62/882,247, filed Aug. 2, 2019, the entirety of which is hereby incorporated by reference.

BACKGROUND

A typical media client operates to receive an analog or digital media stream representing media content such as video and/or audio content and to output the media content and/or forward the stream for presentation of the content on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, mobile communication devices, gaming consoles, streaming media players, and the like.

By way of example, a television could receive a broadcast stream (e.g., over the air, from a set top box, through an Internet connection, or in another manner) and could present the media content of that broadcast stream to a user. As another example, a set top box could receive a broadcast stream from a multi-channel video program distributor and could output the media content of that stream via a High-Definition Multimedia Interface (HDMI) cable or other interface to a television and/or audio/video receiver for playout. As still another example, a digital video or audio recorder could likewise receive a broadcast stream but could store the broadcast stream for later playout. And as yet another example a loudspeaker or headphones could receive a broadcast audio stream from a radio, computer, or other device, and could present the audio content of that stream to a user. Numerous other examples are possible as well.

SUMMARY

When a media client receives, outputs, or otherwise processes a linear media stream for presentation to a user (e.g., when the media client is receiving, transcoding and/or rendering each frame of the media content to facilitate presentation of the content on a user interface, and/or is otherwise processing the ongoing media stream), it may be useful in certain situations for the media client to take special action with respect to the media content. Without limitation, for instance, it may be useful for the media client to revise a portion of the stream's media content, such as to dynamically replace an ad or other segment of the media content with a replacement ad or with other replacement content, or to dynamically supplement a portion of the media content with overlay or split-screen content, such as channel identification, context information, ad content, or the like.

Further, it may be desirable for the media client to perform such content revision at a specific time point within the media stream. For instance, if the media client is to dynamically replace an existing ad with a replacement ad, it may be desirable for the media client to position the replacement ad at a particular time in the media stream when the existing ad would have started. Likewise, if the client is to supplement a specific portion of the media content with an overlay possibly related to that portion, it may be desirable for the client to start the overlay when that portion starts. Other examples are possible as well.

More particularly, the media stream at issue could define a sequence of frames, such as video frames and/or audio frames, and it may be desirable for the media client to perform the content revision on a frame-accurate basis. For instance, for dynamic advertisement insertion (DAI), it may be desirable for the media client to insert a replacement ad in place of an existing ad starting precisely at the first frame of the existing ad. And for adding an overlay to a specific portion of the media stream, it may be desirable for the media client to start the overlay at or in specific time relation to the first frame of that portion of the media stream.

To facilitate having the media client take this or other such action at a desired time point within the media stream that the media client is processing for presentation, a server or other entity (hereafter "server") external to the media client could engage in signaling with the media client, providing the media client with a directive for the media client to take the action, and specifying the time point when the media client is to take the action ("action time point"). The media client could then take the action at the specified time point.

By way of example, the server could first determine the media stream (e.g., channel of content) that the media client is processing for presentation. And as that determined media stream is en route to the media client, the server could then evaluate the en-route media stream to detect presence of a content-modification opportunity in the media stream and to determine a time point of that detected content-modification opportunity in the media stream. Having determined the time point of the detected content-modification opportunity in the media stream that is en route to the media client, the server could then provide the media client with advanced notice of that coming time point, i.e., informing the media client of the coming time point in the media stream before that time point in the media stream reaches the media client to be processed for presentation. That way, the media client could then prepare to carry out the content modification at the indicated time point and could accordingly carry out the content modification at the indicated time point.

This example process could take advantage of a time delay that is likely to exist from the point in time when a content distribution system outputs or otherwise processes any given media content (e.g., frame) of the media stream to be transmitted to the media client to the point in time when the media client receives or otherwise processes that media content for presentation. Depending on the configuration of the system, this delay could be on the order of 5-10 seconds.

Given this delay, it could be possible for the server to detect the presence of a content-modification opportunity in the media stream en route to the media client well enough before that portion of the media stream arrives at the media client for processing. By engaging in relatively quick out-of-band (e.g., Internet Protocol (IP) based) communication with the media client device during that delay period, the server could therefore prepare the media client to engage in content modification at the time of the content-modification opportunity, so that when that point in the media steam arrives at the media client for processing, the media client could then carry out the content modification in a timely manner.

One technical problem that can arise in a system arranged to carry out this process is that the delay between when the content distribution system outputs or otherwise processes the media content of the media stream to when a given media client receives or otherwise processes that media content may be too short. Namely, the delay may not be long enough to allow time for the server to give the media client sufficient advanced notice of the approaching content-modification opportunity, in which case the media client may not have enough time to prepare to prepare for and engage in the content modification by the time the content-modification opportunity arrives.

In fact, this delay could vary from media client to media client and/or from market area to market area, depending on assorted factors, such as the structure and operation of the content distribution system that distributes media streams to media clients, the structure and operation of the media clients, and the structure and operation of the communication paths between the content distribution systems and the media clients, among other possibilities.

It may therefore be the case that, in a given market area (e.g., designated market area (DMA)), the delay between a content distribution system and one or more media clients is long enough to facilitate dynamic content modification, but the delay between the content distribution system and one or more other media clients is not long enough to facilitate the process. Further, it may be the case that the delay between one content distribution system and media clients is long enough to facilitate the process, but the delay between another content distribution system and media clients is not long enough to facilitate the process. And still further, it may be the case that in one market area the delay between one or more content distribution systems and one or more media clients is long enough to facilitate the process but that in another market area, the delay between one or more content distribution systems and one or more media clients is not long enough to facilitate the process.

This variance in delay from case to case may make it difficult to manage implementation of dynamic content modification. For instance, if an advertiser wishes to arrange for implementation of DAI in a given DMA, the variance in delay may result in the DAI not working for some media clients in the DMA. And in instances where the process would not work, there may be wasted signaling and cost with failed attempts to implement the process.

The present disclosure provides a mechanism to help address this technical problem. In particular, the disclosure provides for use of one or more steganographically-encoded timestamps (e.g., one or more watermarked timestamps) as a basis to determine the transmission delay between a content distribution system and a media client and/or between associated entities. Further, the disclosure provides for doing so respectively for each of one or more media clients and/or for each of various serving systems (e.g., each of various content distribution systems, DMAs, or the like), in order to establish a dynamic-content-modification footprint, perhaps represented by data indicating where dynamic content modification is likely to be practical, considering transmission delay.

In an example implementation, a result of this process could be data that indicates (i) which media clients and/or serving systems are candidates for implementing dynamic content modification, based on the associated transmission delay for such entities being long enough, and/or (ii) which other media clients and/or serving systems are not candidates for implementing dynamic content modification, based on the associated transmission delay for such entities not being long enough. For instance, the output could be a map or associated data that represents a dynamic-content-modification footprint, such as a map showing, geographically or otherwise, where dynamic content modification can be implemented. Such output data could help to inform advertising decisions or the like.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 9 is a simplified block diagram of an example media client that could operate in accordance with the disclosure.

DETAILED DESCRIPTION

The present disclosure will discuss example implementation in connection with media clients comprising content presentation devices such as televisions, loudspeakers, or the like. It will be understood, however, that various principles disclosed could extend to apply with respect to other types of media clients, such as set top boxes or other receivers, mobile phones, and the like. Further, it will be understood that various arrangements and processes described herein can take various other forms. For instance, elements and operations can be re-ordered, distributed, replicated, combined, omitted, added, or otherwise modified. And it will be understood that functions described herein as being carried out by one or more entities could be implemented by and/or on behalf of those entities, through hardware, firmware, and/or software, such as by one or more processing units executing program instructions or the like.

Figure 1:
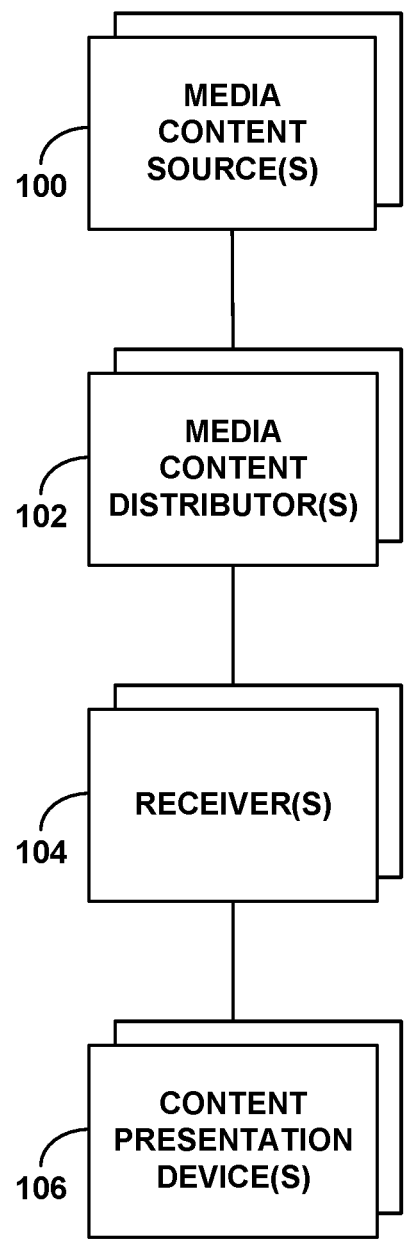
FIG. 1 is a simplified block diagram of an example system in which various disclosed principles can be applied.

Referring to the drawings, as noted above, FIG. 1 is a simplified block diagram of an example system in which various disclosed principles can be applied. As shown in FIG. 1, the example system includes one or more media content sources 100 (e.g., broadcasters, web servers, etc.), one or more media content distributors 102 (e.g., multi-channel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, for instance, the media content sources 100 could be national broadcasters, such as ABC, NBC, CBS, FOX, HBO, and CNN, the media content distributors 102 could be local affiliates and/or other local content distributors, possibly for specific DMAs, and the receivers 104 and content presentation devices 106 could then be situated at customer premises, such as homes or business establishments.

With this or other arrangements, the content sources 100 could deliver media content to the content distributors 102 for distribution to receivers 104 at customer premises, and the content distributors could distribute the media content to the receivers 104 as particular channels of content (e.g., particular frequencies, particular streaming media sessions, or other defined channels). Each receiver 104 could then respond to user input or one or more other triggers by tuning to or otherwise starting to receive a selected channel and outputting to one or more content presentation devices 106 a media stream representing media content of the selected channel. And each content presentation device 106 could thus receive and render the media content (e.g., display or otherwise present the content).

Without limitation, for instance, each content presentation device could be a television situated at customer premises, which could be coupled by an HDMI cable with a cable-TV set top box, and the set top box could be coupled through a local distribution network with a cable-TV head end that distributes various television channels provided by national and/or local broadcasters. In this arrangement, the television could regularly receive a media stream via HDMI from the set top box, and the set top box could tune to a particular channel from the head end in response to user input, so that the media stream arriving at the television would then represent the user-selected channel. Other examples are possible as well.

Figure 2:
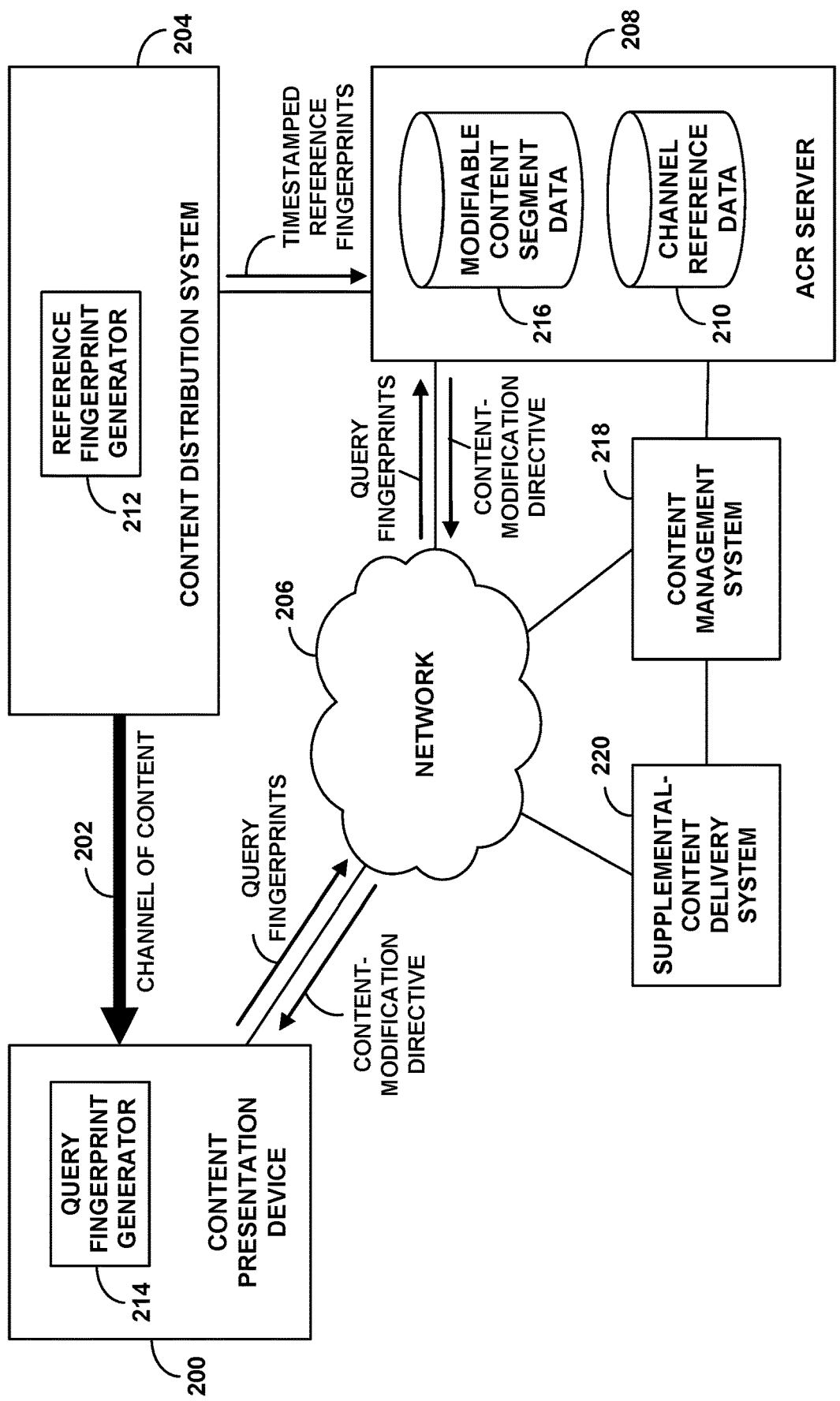
FIG. 2 is another simplified block diagram of an example system in which various disclosed principles can be applied.

FIG. 2 next illustrates more specifically an example system in which some of the presently disclosed features could be implemented.

FIG. 2 shows at its top a representative content presentation device 200 receiving a channel of content 202 being provided by a content distribution system 204. By way of example, the content presentation device 200 could be an example content presentation device 100 as shown in FIG. 1, and the content distribution system 204 could comprise any system that outputs, delivers, or otherwise provides media content, perhaps as a representative media content source 100 and/or media content distributor 102 of FIG. 1, among other possibilities.

As such, the content presentation device 200 could be receiving and rendering the channel of content 202 in a media stream directly or indirectly from the content distribution system 204. The channel might be a linear broadcast feed and/or might be a streaming media channel, and the content presentation device might be receiving the channel through any of a variety of distribution channels, such as but not limited to cable, satellite, terrestrial over-the-air broadcast, or others now known or later developed.

In an example implementation, the media content of the channel could define a sequence of digital frames of media content that the media client is configured to render for presentation to a user. For instance, a media content source, media content distributor, and/or other entity might be broadcasting, streaming, or otherwise providing this sequence of frames encapsulated in a transport stream for receipt by a receiver (e.g., that is currently set to receive the channel of content), and the receiver may be extracting the sequence of frames from the transport stream and outputting the sequence of frames as the media stream for receipt and rendering by the media client.

As further shown in FIG. 2, the content presentation device 200 is interconnected with a communication network 206, which could be a packet-switched network such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the media stream representing the channel of content 202 provided by the content distribution system 204.

Shown accessible via the network 206 (e.g., at a defined IP address on the network) is an automatic content recognition (ACR) server 208, which could operate to identify the channel of content being rendered by the content presentation device 200 and to coordinate having the content presentation device engage in channel-specific action, such as dynamic content modification of content included on the identified channel.

In practice, the ACR server 208 could determine in various ways the channel of content being rendered by the content presentation device 200. As one example, if the content presentation device 200 has information that identifies the channel of content being rendered, the content presentation device 200 might transmit to the ACR server 208 a message that specifies the channel being rendered. Alternatively, the ACR server 208 and content presentation device 200 could cooperatively engage in fingerprint-based ACR to identify the channel.

With fingerprint-based ACR, the ACR server 208 could be provisioned with reference data that includes digital reference fingerprints respectively representing each of various known channels of media content (e.g., each of the channels within a subscription plan for a set-top box that supplies media content to the content presentation device) and that maps the reference fingerprints to the respective channels that they represent. Further, the ACR server 208 could receive digital query fingerprints that represent the media content currently being rendered by the content presentation device, and the ACR server 208 could compare the query fingerprints with the reference fingerprints in an effort to find a match. Upon finding that the query fingerprints match the reference fingerprints mapped to a particular channel, the ACR server 208 could thus determine that the channel being rendered by the content presentation device is that particular channel.

In an example implementation of fingerprint-based ACR, the content distribution system 204 that distributes each of one or more known channels of media content to content presentation devices could regularly provision the ACR server 208 with reference data 210 to enable the ACR server 208 to conduct the fingerprint analysis.

In particular, for each of one or more channels that the content distribution system 204 is distributing, the content distribution system 204 could apply a reference-fingerprint generator 212 (e.g., program instructions executable by a processor of the content distribution system 204) to generate reference fingerprints on a per-frame basis or other ongoing basis, and the content distribution system 204 could establish for each such reference fingerprint an associated reference timestamp indicating the time at which the content distribution system 204 processed the frame. Further, the content distribution system 204 could regularly transmit to the ACR server 208 the reference fingerprints, specifying for each reference fingerprint the associated reference timestamp, the channel whose frame the reference fingerprint represents, and an identity of the content distribution system 204.

Without limitation, an example digital fingerprinting process as to video content could apply on a per video frame basis and could involve establishing a representation of luminosity and/or other video characteristics. For instance, for a given video frame, the fingerprint generator 212 could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator 212 could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination, or series of such bit strings or other representative values defining a digital fingerprint, on a sliding window basis. Other digital fingerprinting processes could be used as well.

The ACR server 208 could thus regularly receive from the content distribution system 204 the reference data including these reference fingerprints, each being tagged or otherwise associated with information that maps the reference fingerprint to the channel whose frame the reference fingerprint represents, and each being tagged or otherwise associated with an associated reference timestamp defining server time of the underlying frame of content. And as the ACR server 208 receives this reference data, the ACR server 208 could store the reference data in a relational database or other form suitable for ready searching and access.

In addition, as the content presentation device 200 receives and renders a media stream representing a given channel of media content 202, the content presentation device could generate the query fingerprints of the media content on a pre-frame basis or other ongoing basis and could regularly transmit the generated query fingerprints to the ACR server 208 for analysis.

To facilitate this, the content presentation device 200 in an example implementation could be equipped with a fingerprint generator 214 (e.g., program instructions executable by a processor of the content presentation device 200), configured to generate query fingerprints representing the media content of the channel 202 that the content presentation device 200 is currently rendering. The fingerprint generator 214 could be configured to receive as input a copy of the media content of the channel as the media content arrives at the content presentation device 200 and/or is processed for presentation by the content presentation device 200, and the fingerprint generator 214 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could transmit its generated query fingerprints via network 206 to the ACR server 208 for analysis, to enable the ACR server 208 to engage in fingerprint-based ACR and coordination of associated channel-specific action. By way of example, the content presentation device 200 could periodically or otherwise from time to time transmit to the ACR server 208 the query fingerprints representing a latest series of frames of the channel being rendered by the content presentation device 200. For instance, the content presentation device 200 could generate a message carrying the latest generated query fingerprints and could transmit the generated message to the IP address of the ACR server 208 for analysis.

Given the query fingerprints representing media content of the channel 202 being rendered by the content presentation device 200, and given the reference data including reference fingerprints respectively representing each of various known channels, the ACR server 208 could engage in fingerprint-based ACR processing. For instance, on an ongoing basis or in response to one or more trigger events, the ACR server 208 could compare the query fingerprints provided by the content presentation device 200 with the reference fingerprints provided by the content distribution system 204.

To compare a given query fingerprint with a given reference fingerprint, the ACR server 208 could compare corresponding portions of the fingerprints with each other to determine whether the portions match exactly or within defined tolerances. For example, the ACR server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of a particular channel, the ACR server 208 could then conclude that that is the channel being rendered by the content presentation device 200.

In a representative implementation, once the ACR server 208 has determined, through fingerprint-based ACR or any in any other manner, the channel that the content presentation device is rendering, the ACR server 208 or another entity could then engage in a process to facilitate dynamic content modification, such as targeted advertisement replacement. Thus, the dynamic content modification could be responsive to the fingerprint-based ACR.

By way of example, once the ACR server 208 has determined the channel that the content presentation device is rendering, the ACR server 208 could then use that determined channel identity as a basis to detect when a content-modification opportunity is about to occur on that particular channel. And the ACR server 208 or other entity could then responsively cause the content presentation device to carry out a content modification at the time of the content-modification opportunity.

In line with the discussion above, this example channel-specific action could take advantage of the time delay that is likely to exist from the point in time when the content distribution system 204 outputs media content of the channel for transmission to the content presentation device 200 to the point in time when the content presentation device 200 receives and/or renders that media content. As noted above, this delay might be on the order of 5-10 seconds.

Given that delay, it may be possible for the content distribution system 204, the ACR server 208, and/or one or more other entities to detect the presence of particular content defining a content-modification opportunity on the channel that is en route to (e.g., about to be or being distributed to) the content presentation device 200 well enough before that content arrives at the content presentation device 200. Namely, as discussed above, by engaging in relatively quick out-of-band (e.g., IP-based) communication with the content presentation device 200 during that delay period, the ACR server 208 could then prepare the content presentation device 200 to engage in content modification with respect to the detected content, so that when the detected content ultimately arrives at the content presentation device 200 and/or is ready for presentation by the content presentation device 200, the content presentation device 200 could carry out the content modification in a timely manner.

As to content modification, for instance, the ACR server 208 could be provisioned in advance with modifiable-content segment data 216 that includes digital fingerprints respectively representing each of various modifiable-content segments of media content, along with associated metadata per modifiable-content segment, such as a duration of the segment, an identifier of the segment, a type of associated content modification (e.g., replacement or overlay) and the like. For instance, a content management system 218 could generate and provide this information in advance to the ACR server.

Having identified the channel being rendered by the content presentation device, the ACR server 208 could then compare the ongoing sequence of reference fingerprints representing that identified channel with the fingerprints representing the various modifiable-content segments. And upon finding with sufficient certainty that the reference fingerprints of the identified channel match the fingerprints representing a particular modifiable-content segment, the ACR server 208 could reasonably conclude that the channel of media content en route to the content presentation device includes that modifiable-content segment. Further, the ACR server could thereby determine from the reference data 210 of the identified channel the reference timestamp indicating when the modifiable content segment is present on the channel.

Upon so detecting the presence of a modifiable-content segment in the media content of the channel that is en route to the content presentation device 200, the ACR server 208 could then responsively engage in out-of-band signaling with the content presentation device 200 to enable, cause, and prepare the content presentation device 200 to perform a content modification with respect to that particular modifiable-content segment. Namely, the ACR server 208 could transmit to the content presentation device 200 a content-modification directive, directing the content presentation device 200 to carry out the content modification.

In this directive, the ACR server 208 could provide the content presentation device 200 with timing information regarding the upcoming content modification opportunity. This timing information regarding the upcoming content modification opportunity could include the reference timestamp that the reference data 210 indicates for the reference fingerprint representing the first frame of the modifiable-content segment. With this timing information, the content presentation device 200 could accordingly plan to carry out a content modification at the indicted action time point as the content presentation device 200 processes the channel of content for presentation.

Further, the ACR server 208 could provide the content presentation device 200 with various other information regarding the modifiable content segment, to enable the content presentation device to carry out the content modification at the indicated time of the modifiable-content segment. For instance, the ACR server 208 could provide the content presentation device 200 with metadata as described above, such as a duration of the segment, an identifier of the segment, and a type of associated content modification (e.g., replacement or overlay) and the like.

With this information, the content presentation device 200 could then responsively work with the content management system 218 and/or another entity to obtain details of the content modification to perform with respect to the upcoming modifiable-content segment. For instance, the content presentation device 200 could transmit to the content management system 218 a request that provides the content management system 218 with the modifiable-content segment identifier and other associated metadata about the modifiable content segment. And the content management system 218 could responsively provide the content presentation device 200 with information to facilitate the content modification.

The content management system 218 could use various information as a basis to determine supplemental content that the content presentation device 200 should render in place of or as an overlay superimposed on the modifiable-content segment. For instance, the content management system 218 could use user-demographics, location, and/or other information regarding the content presentation device 200 as a basis to determine appropriate supplemental content.

Further, the content management system 218 could ascertain a storage location of determined supplemental content and could provide the content presentation device 200 with an indication of that storage location. For instance, the content management system 218 could query a supplemental-content delivery system 220 to determine a uniform resource locator (URL) or other address from which the content presentation 200 device could obtain the supplemental content from a network server or from local data storage of the content presentation device 200. And the content management system 218 could provide the content presentation device 200 with that address and/or with other information to enable the content presentation device 200 to obtain the supplemental content. Alternatively, the content management system 218 itself or another entity could provide the content presentation device 200 with the supplemental content.

With this information, the content presentation device 200 could thus obtain the supplemental content and could plan to present the supplemental content (e.g., as replacement or overlay) at the time of the modifiable-content segment on the channel that the content presentation device 200 is rendering.

The example content-modification process described so far could be carried out for various purposes. Without limitation, for instance, the content-modification process could be carried out to facilitate DAI, such as where the content presentation device replaces a generally applicable ad (e.g., a nationally broadcast ad) with a replacement ad possibly selected based on location, user demographics, and/or other information specific to the content presentation device.

For DAI, an entity such as content broadcaster, distributor, or ad-replacement service might enter into agreements with advertisers to facilitate replacing playout of certain ads, deemed "replaceable ads," with different ads, deemed "replacement ads." For each of various replaceable ads, the content management system 218 or other entity could then receive a copy of the replaceable ad and could provision the ACR server 208 with digital fingerprints representing the replaceable ad and with associated data regarding the replaceable ad. For instance, for each replaceable ad, the content management system 218 could generate digital fingerprints of the replaceable ad on a per-frame basis or the like and could transmit to the ACR server 208 the generated fingerprints of the replaceable ad along with metadata as described above, such as a unique identifier of the replaceable ad, a duration of the replaceable ad, an indication that the ad is to be replaced, and so forth. (Further, the data provided to the ACR server 208 could include a traffic schedule that indicates when specific ads, with particular identifiers and associated fingerprints, are scheduled to be presented on each of one or more channels.)

Once the ACR server 208 has identified the channel being rendered by the content presentation device 200, the ACR server 208 could then responsively compare the reference fingerprints representing that identified channel with the fingerprints representing various replaceable ads. And upon finding with sufficient certainty that the reference fingerprints of the identified channel match the fingerprints representing a particular replaceable ad, the ACR server 208 could reasonably conclude that the channel being rendered by the content presentation device 208 includes the replaceable ad, and more specifically that the media content en route to the content presentation device 208 includes that replaceable ad.

In response to this conclusion, the ACR server 208 and/or another entity could engage in signaling with the content presentation device 200 to prepare the content presentation device 200 to present a replacement ad in place of the replaceable ad. In line with the discussion above, for instance, the ACR server 208 or other entity could transmit to the content presentation device 200, through out-of-band signaling, one or more messages that provide the content presentation device 200 with (i) a reference timestamp as described above that indicates when the replaceable ad will occur on the channel that the content presentation device 200 is rendering, (ii) the unique identifier of the replaceable ad, and (iii) a duration of the replaceable ad.

Given the identifier and duration of the replaceable ad, the content presentation device 200 could then engage in out-of-band signaling with the content management system 218 to ascertain a replacement ad that the content presentation device should render in place of the replaceable ad. Here, the content presentation device 200 might provide the content management system 218 with a user identification, demographics, location, and/or other information that the content management system 218 could use as a basis to select an appropriate replacement ad. Further, the content management system 218 could use the duration of the replaceable ad, indicated by the content presentation device 200 or mapped to the ad-identifier of the replaceable ad for instance, to select a replacement ad that is of the same duration as the replaceable ad.

The content management system 218 could then work with the supplemental-content delivery system 220 to determine a URL or other address or location from which the content presentation device could obtain the replacement ad and could inform the content presentation device 200 accordingly. And the content presentation device 200 could thus obtain the replacement ad and plan to render it in place of the replaceable ad on the channel that the content presentation device 200 is rendering, as discussed above.

A technical issue with this process is that, if the ACR server 208 characterizes the time of occurrence of the modifiable-content segment as the reference timestamp time of when the modifiable-content segment was processed by the content distribution system 204, that timing information alone would not account for the transmission delay between when the content distribution system 204 outputs or otherwise processes the modifiable-content segment to when the content presentation device 200 receives or otherwise processes the modifiable-content segment. Namely, as the channel of content flows from the content distribution system 204 to the content presentation device 200, the time of arrival or other processing of the modifiable-content segment at the content presentation device 200 would be later than the reference time by at least that transmission delay, which would make dynamic content modification at that indicated time impractical By way of example, if the transmission delay is 10 seconds, then modifiable-content segment would arrive at the content presentation device at least 10 seconds after the reference time of the modifiable-content segment that the ACR server 208 indicated in its directive to the content presentation device 200. Therefore, given just that timing information, the content presentation device 200 would be unable to carry out dynamic content modification at the appropriate time.

One way to help address this technical issue as to a given content presentation device 200, is to determine the transmission delay between the content distribution system 204 and the content presentation device 200, such as the difference in time from the time when the content distribution system 204 outputs or otherwise processes the media content to the time when the content presentation device 200 receives or otherwise processes the media content. Given knowledge of that transmission delay, the ACR server 208, content presentation device 200, or another entity could then translate the reference time of a content-modification opportunity to the time that the content presentation device 200 would receive or otherwise process that content-modification opportunity. That way, the content presentation device 200 could then plan to carry out dynamic content modification at the appropriate time.

In accordance with the present disclosure, this transmission delay could be established by use of steganographically encoded time information.

By way of example, each of one or more media streams transmitted from the content distribution system 204 to the content presentation device 200 could be watermarked with one or more watermarks each encoding reference time of the watermark, i.e., the reference time of the point at which the watermark is positioned in the media stream. As the content presentation device 200 receives each such ongoing media stream, the content presentation device 200 could then detect and decode each such watermark to determine the reference time encoded by the watermark and could compute a difference between that reference time and a current time at the content presentation device, with that difference defining a transmission delay between the content distribution system 204 and the content presentation device 200.

The content presentation device 200 could then use that computed transmission delay as a basis to determine when to carry out content modification on a channel of content, given an ACR-server-provided reference timestamp indicating when to carry out the content modification, such as a reference timestamp of a given content-modification opportunity. Alternatively, the content presentation device 200 could report the determined transmission delay to the ACR server 208, and the ACR server 208 could use that transmission delay as a basis to translate the reference time of the content-modification opportunity to a time at which the content presentation device 200 should carry out the content modification and could then include that determined time in its content-modification directive to the content presentation device 200.

Other mechanisms for using the computed transmission delay to facilitate dynamic content modification could be applied as well. Further, note that the channel of content in which the content modification would be carried out at a time determined based on the computed transmission delay could be one of the one or more media streams in which the one or more watermarks were provided and used as a basis to determine the transmission delay, or could be another channel of content.

Figure 3:
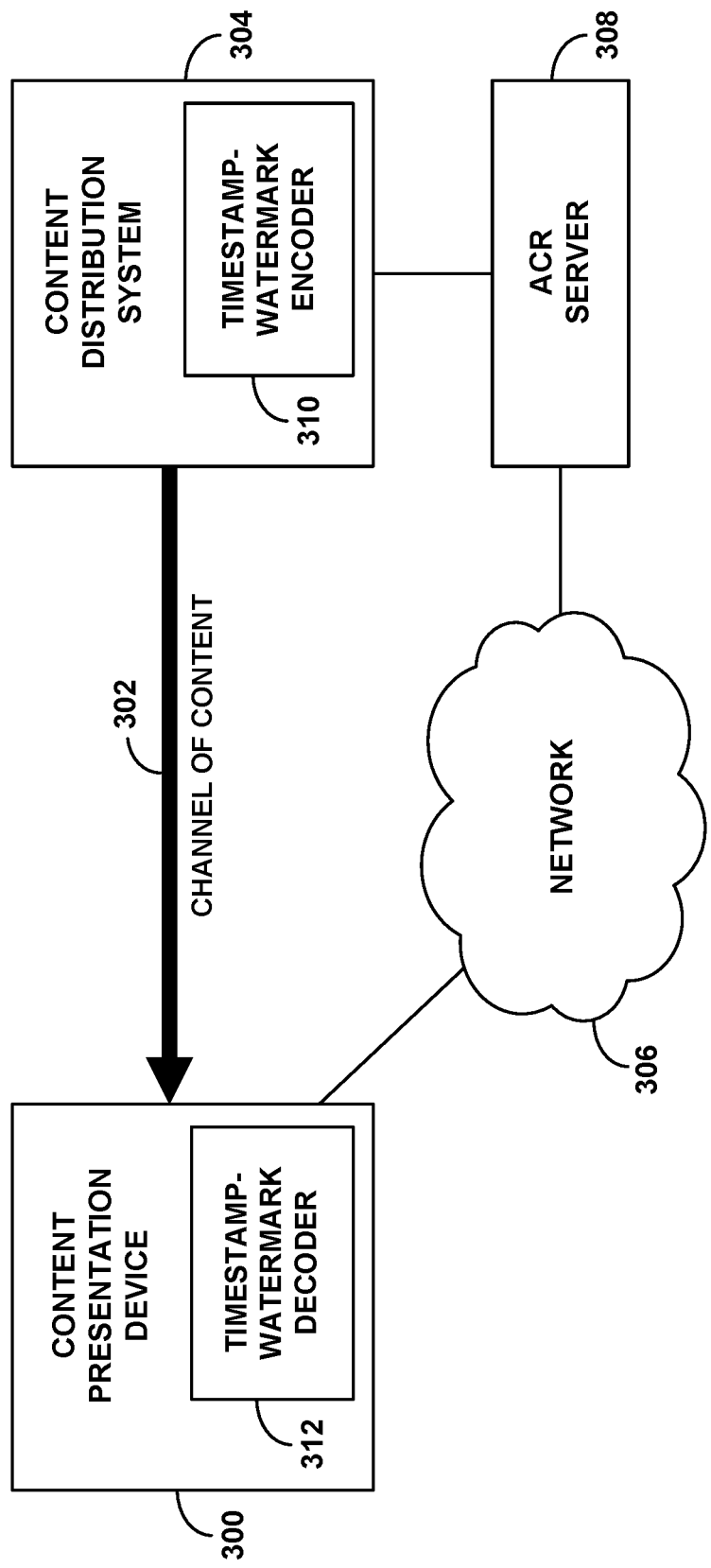
FIG. 3 is another simplified block diagram of an example system in which various disclosed principles can be applied.

FIG. 3 is a simplified block diagram illustrating components that could be involved in an example implementation. In particular, FIG. 3 illustrates a content presentation device 300, a content distribution system 304, and an ACR server 308.

The content presentation device 300, content distribution system 304, and the ACR server 308 could be examples of the content presentation device 200, the content distribution system 204, and the ACR server 208 discussed above. For instance, the content presentation device 300 could be a television located at customer premises, the ACR server 308 could be a network server configured to carry out fingerprint matching, content identification, and triggering of dynamic content modification as discussed above, with the content presentation device 300 and ACR server 308 being in communication with each other via a network 306 such as the Internet. Further the content distribution system 304 could operate to distribute a media stream in a channel of content directly or indirectly to the content presentation device 300.

As further shown in FIG. 3, the content distribution system 304 could include a timestamp-watermark encoder 310 that the content distribution system 304 could use in order to encode one or more timestamp-watermarks into a media stream that is being output or otherwise processed for delivery to at least the content presentation device 300. And the content presentation device 300 could include a timestamp-watermark decoder 312 that the content presentation device 300 could use in order to decode one or more timestamp-watermarks from a media stream that the content presentation device 300 is receiving and/or processing for presentation. Each of these components could comprise software stored in data storage and executable by a processing unit and/or could take other forms.

As is known in the art, watermarking typically involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking may permanently change the media content and be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psycho-acoustic encoding.

Examples of audio watermarks and corresponding watermark detection techniques, without limitation, are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

In line with the discussion above, each timestamp-watermark that the content distribution system 304 encodes into the media stream could be at a respective time position in the media stream, such as at or in relation to a particular frame of the media stream, and could encode reference time indicating the time at which the content distribution system 304 outputs or otherwise processes that position of the ongoing media stream.

As the content presentation device 300 receives or otherwise processes one or more such media streams, the content presentation device 300 could then detect and decode one or more such watermarks from the media stream(s), extracting or otherwise determining the reference time encoded by the watermark. And for each such watermark, the content presentation device 300 could compute a respective time offset defining transmission delay between that indicated reference time and a current time at the content presentation device 300. Further, if the content presentation device 300 uses multiple such watermarks to compute multiple such transmission delays between reference time at the content distribution system 304 and current time at the content presentation device 300, the content presentation device 300 could compute an ongoing average or other representative transmission delay over a sliding window of time or the like. In addition, the content presentation device 300 could report each such computed transmission delay and/or a rolled up average transmission delay to the ACR server 308.

The content presentation device 300 or ACR server 308 could then use this established transmission delay as a basis to enable the content presentation device 300 to carry out dynamic content modification at a desired action time point in a channel of content 302 that the content presentation device 300 is processing for presentation.

As noted above, for instance, when the content presentation device 300 is receiving and/or processing a channel of content 302 comprising a media stream and the content presentation device 300 receives from the ACR server 308 a directive to carry out dynamic content modification at a particular action time point indicated as reference time, the content presentation device 300 could apply the computed transmission delay to determine the time when the content presentation device 300 should carry out that dynamic content modification. For instance, the content presentation device 300 could add the computed transmission delay to the indicated action time point in order to compute a corresponding time of the action time point at the content presentation device 300. And the content presentation device 300 could then carry out the dynamic content modification at that computed time.

Alternatively, when the ACR server 308 determines the reference time of a content-modification opportunity in the media stream, the ACR server 308 could add the computed transmission delay to that reference time in order to translate the reference time to a time when the content-modification opportunity would be processed by the content presentation device 300. And the ACR server 308 could specify that determined time in its content-modification directive to the content presentation device 300, so that the content presentation device 300 could then carry out the dynamic content modification appropriately at that time.

As further indicated above, another technical issue that can arise in this process is that the transmission delay between the content distribution system 304 and the content presentation device 300 may be too short to allow the content presentation device 300 to prepare for carrying the dynamic content modification at the approaching action time point.

It may take some time and effort for the content presentation device 300 to prepare for carrying out dynamic content modification at an indicated action time point. As indicated above, for instance, the content presentation device 300 may need to interact with a content management system and a supplemental content delivery system, to determine the content modification. Further, there could be other or alternative steps involved in preparing to carry out the dynamic content modification at the desired time. Unfortunately, if the transmission delay between the content distribution system 304 and content presentation device 300 is too short, then the content presentation device 300 may not have enough time to engage in the necessary preparation between the time that the content presentation device 304 receives the content-modification directive (or otherwise learns of an upcoming content-modification opportunity) to the time of the upcoming content-modification opportunity. Therefore, the content presentation device 300 may be unable to carry out the dynamic content modification or may at least be unable to do so in a timely manner.

In accordance with the present disclosure, a computing system could work to resolve this issue by making use of the transmission delay determined based on timestamp-watermarking as discussed above. In particular, as a condition precedent for the ACR server 308 engaging in processing to direct the content presentation device 300 to implement dynamic content modification with respect to content being transmitted from the content distribution system 304 to the content presentation device 300, the computing system could require that the computed transmission delay between the content distribution system 304 and the content presentation device 300 is long enough to accommodate dynamic content modification. The computing system could thus use the watermark-based determination of transmission delay as a basis to control whether the ACR server 308 will engage in processing to direct the content presentation device to implement dynamic content modification.

In a representative implementation for instance, the computing system could be provisioned with a predefined threshold-long transmission delay value that is deemed to be long enough to allow enough time for a content presentation device to prepare for carrying out dynamic content modification in a usual case, or a predefined threshold-short transmission delay value that is deemed to be so short as to not allow enough time for a content presentation device to prepare for carrying out dynamic content modification in a usual case. Such threshold values could be established through experimentation and engineering design choice, or through automated machine learning processes, and stored in the computing system.

Given the transmission delay computed for transmission between the content distribution system 304 and the content presentation device 300 based on timestamp-watermarking as discussed above, the computing system could then compare that computed transmission delay with a provisioned threshold transmission delay value. And based on that comparison the computing system could determine whether the transmission delay between the content distribution system 304 and the content presentation device 300 is long enough to facilitate dynamic content modification.

If the computing system thereby determines that the transmission delay between the content distribution system 304 and the content presentation device 300 is long enough to facilitate dynamic content modification, then the computing system could allow or cause the ACR server 308 to engage in processing to direct the content presentation device to implement dynamic content modification. Whereas if the computing system thereby determines that the transmission delay between the content distribution system 304 and the content presentation device 300 is not long enough to facilitate carrying out dynamic content modification, then the computing system could block or forgo causing the ACR server 308 engaging in processing to direct the content presentation device 300 to carry out dynamic content modification.

In an example implementation, in response to at least the determination being that the transmission delay between the content distribution system 304 and the content presentation device 300 is long enough for the content presentation device 300 to be able to carry out dynamic content modification with respect to content transmitted from the content distribution system 304 to the content presentation device 300, the ACR server 308 could thus engage in various steps to trigger dynamic content modification by the content presentation device 300. For instance, in response to at least that determination, the ACR server 308 could engage in the steps described above to identify the channel being rendered by the content presentation device 300, to detect on the channel being rendered by the content presentation device 300 the presence of a content-modification opportunity such has a replacement ad, and to direct the content presentation device 300 to carry out dynamic content modification with respect the detected content-modification opportunity.

Whereas, in response to at least the determination being that the transmission delay between the content distribution system 304 and the content presentation device 300 is too short, i.e., not long enough to allow the content presentation device 300 to be able to carry out dynamic content modification with respect to content transmitted from the content distribution system 304 to the content presentation device 304, then the ACR server 308 could forgo engaging in one or more of those steps. Namely, in response to that determination, the ACR server 308 could forgo (i) working to identify the channel being rendered by the content presentation device, (ii) working to detect on that channel the presence of a content-modification opportunity, and/or (iii) directing the content presentation device 300 to carry out dynamic content modification with respect to the content-modification opportunity, among other possibilities.

Optimally, this process could help to minimize the likelihood of engaging in unnecessary processing and signaling trying to have the content presentation device 300 carry out dynamic content modification in a situation where the transmission delay between the content distribution system 304 and the content presentation device 300 is likely to be impractically short.

In an example implementation of this process, the computing system could be at the ACR server 308, implemented by a programmed processing unit of the ACR server 308 for instance. The computing system could thus learn the transmission delay between the content distribution system 304 and the content presentation device 300 by receiving the content presentation device's report of the computed transmission delay as described above. Alternatively, the computing system could be provided at another entity that would interwork with the ACR server 308.

In addition, as discussed above, this process could also be extended to apply in a system that includes multiple content presentation devices and/or multiple content distribution systems, where the transmission delay may vary from content presentation device to content presentation device and/or from content distribution system to content distribution system.

In such a system, there could be some content presentation devices that would have sufficiently long enough transmission delay to facilitate carrying out dynamic content modification, and there could be other content presentation devices that would not have long enough transmission delay to facilitate dynamic content modification. For example, of all of the content presentation devices served by a given content distribution system, some may have sufficiently long transmission delays but others may not. As another example, of multiple content distribution systems in a given DMA, the content presentation devices served by a given content distribution system may have sufficiently long transmission delays but the content presentation devices served by another of the content distribution systems may not. And as still another example, of multiple DMAs, the content presentation devices in a given DMA may have sufficiently long transmission delays but the content presentation devices in another DMA may not.

Given this variance, it may be useful to apply the above process in order to determine which content presentation devices would have long enough transmission delays to be reasonable candidates for carrying out dynamic content modification, and to establish a set of data defining a dynamic content modification footprint, indicating which content presentation devices, perhaps by location, are deemed candidates for carry out dynamic content modification. For instance, this data could indicate which content presentation devices served by a given content distribution system or in a given DMA have long enough transmission delays and are therefore candidates for carrying out dynamic content modification, and/or which content distribution systems serve such candidate content presentation devices, among another possibilities.

As noted above, such data could help inform targeted advertising decisions or the like. For instance, provided with this data, advertisers could decide whether, where, and to what extent they would like to arrange for implementation of DAI. Further, this data could be used by an ACR provider as a basis to control whether, where, and to what extent the ACR provider carries out processing to direct content presentation devices to implement dynamic content modification. For instance, the computing system might provide this data for use by a fingerprint-matching server or other ACR server to control which content presentation devices the ACR server would work with to trigger implementation of dynamic content modification.

Figure 4:
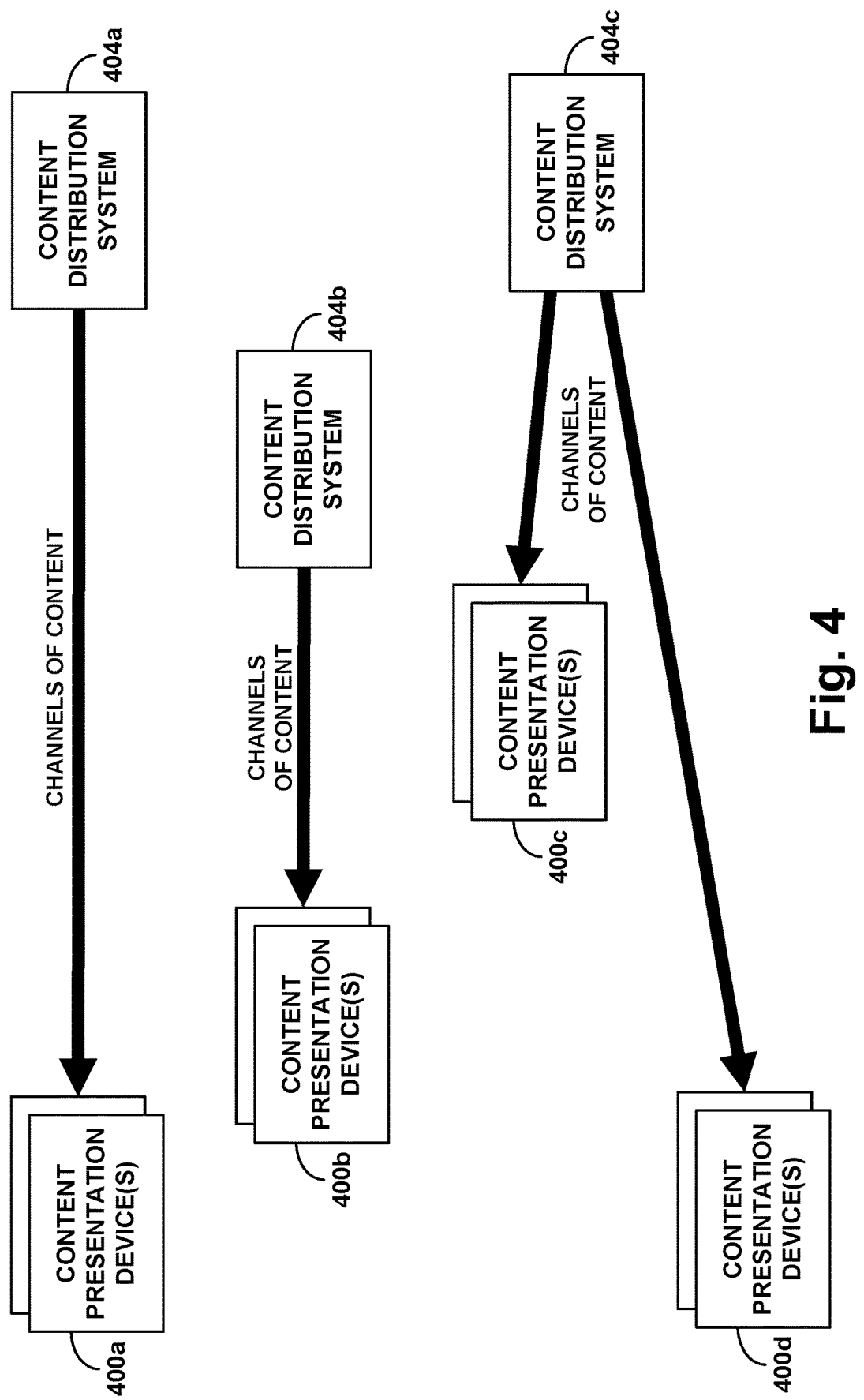
FIG. 4 is another simplified block diagram of an example system in which various disclosed principles can be applied.

FIG. 4 illustrates an example system in which this process could be carried out, where the system includes multiple content distribution systems 404a, 404b, 404c, and multiple content presentation devices 400a, 400b, 400c, 400d. Namely, figure illustrates that content distribution system 404a would deliver channels of content to one or more content presentation devices 400a, content distribution system 404b would deliver channels of content to one or more content presentation devices 400b, and content distribution system 404c would deliver channels of content to content presentation devices 400c and to content presentation devices 400d.

In this figure, transmission delays from content distribution systems to content presentation devices are represented by the illustrated length of bold arrows extending from the content distribution systems to the content presentation devices. Namely, longer bold arrows correspond with longer transmission delays, and a shorter bold arrows correspond with shorter transmission delay. These varying transmission delays could be attributable to varying distance of transmission and/or to any of a variety of other factors.

In an example implementation, a computing system could use the process described above to determine respectively for each content presentation device 400 the transmission delay for transmission of media content to the content presentation device 400 from the content presentation device's serving content distribution system 404. And for each such content presentation device 400, the computing system could use the process described above to determine whether that determined transmission delay is long enough to facilitate dynamic content modification as to media content transmitted from the content distribution system 404 to the content presentation device.

With the arrangement illustrated, for instance, the computing system may thereby determine that the transmission delays for transmission of media content from content distribution system 304a to content presentation devices 400a are long enough to facilitate dynamic content modification and therefore that content presentation devices 400a are candidates for carrying out dynamic content modification. And likewise, the computing system may determine that the transmission delays for transmission of media content from content distribution system 404c to content presentation devices 400d are long enough to facilitate dynamic content modification and therefore that content presentation devices 400d are also candidates for carrying out content modification.

On the other hand, the computing system may thereby determine that the transmission delays for transmission of media content from content distribution system 304b to content presentation devices 400b are too short and therefore that content presentation devices 400b are not candidates for carrying out dynamic content modification. And likewise, the computing system may determine that the transmission delays for transmission of media content from content distribution system 404c to content presentation devices 400c are too short and therefore that content presentation devices 400c are also not candidates for carrying out content modification.

For each such content presentation device 400 that the computing system deems to be a candidate for carrying out dynamic content modification, the computing system could determine the identity of the content presentation device 400 through signaling from the content presentation device 400, and the computing system might also look up or otherwise determine the geographic location of the content presentation device 400. Further, the computing system might determine the identity of the content presentation device's serving content distribution system 404, for instance based on the metadata associated with the reference fingerprints generated for one or more channels of content delivered to the content presentation device 400 as discussed above, and the computing system might also look up the locations and/or DMAs of those content distribution systems 404.

The computing system could thereby establish and output dynamic-content-modification footprint data that indicates which content presentation devices are candidates for carrying out dynamic content modification. For instance, the computing system could output a heat map or other data depicting or otherwise indicating counts of candidate content presentation devices per geographic area and possibly per DMA or content distribution system, or more or less granularly indicating where and/or to what extent dynamic content modification could likely be successfully carried out. Alternatively, the computing system could output such data in other forms deemed practical for use.

In an example implementation, as noted above, the computing system could output this data for use by an ACR server to control the extent to which the ACR server engages in processing to direct content presentation devices to carry out dynamic content modification. Namely, provided with this dynamic content modification footprint data established as described above, the ACR server could determine which content presentation devices (e.g., of which serving systems such as content distribution systems or DMAs) are candidates for carrying out dynamic content modification, and the ACR server could limit itself to engage in processing to direct implementation of dynamic content modification by just those candidate content presentation devices. Thus, the ACR could forgo or otherwise not carry out certain processing steps as discussed above with respect to content presentation devices that are not deemed to be candidates for carrying out dynamic content modification.

Figure 5:
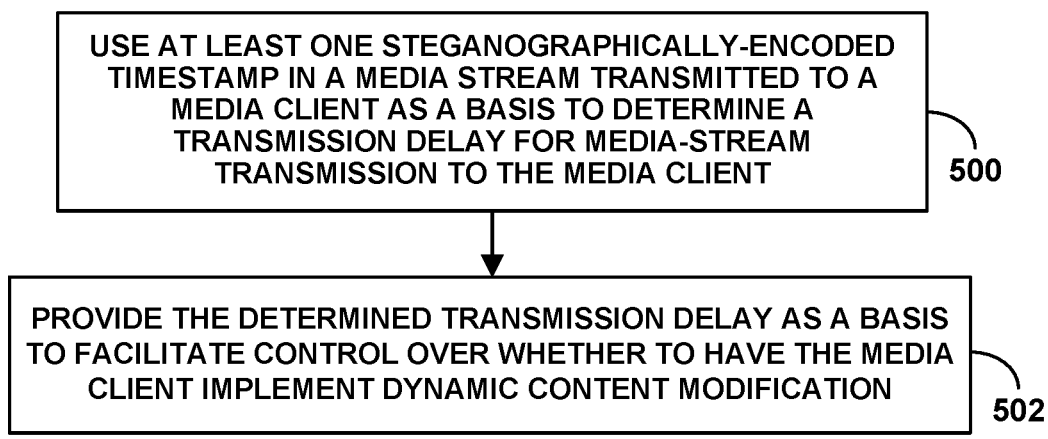
FIG. 5 is a flow chart depicting a method that could be carried out in accordance with the disclosure.

FIG. 5 is a flow chart depicting a method that can be carried out in accordance with the present disclosure.

As shown in FIG. 5, at block 500, the method includes using at least one steganographically-encoded timestamp (e.g., a watermark that encodes time information) in a media stream transmitted to a media client (e.g., a content presentation device) as a basis to determine a transmission delay for media-stream transmission to the media client. And at block 502, the method includes providing the determined transmission delay as a basis to facilitate control over whether to have the media client implement dynamic content modification (e.g., DAI).

In line with the discussion above, the media stream in this method could be transmitted to the media client from a content distribution system. And in that case, the act of using the at least one steganographically-encoded timestamp in the media stream transmitted to the media client as a basis to determine the transmission delay for media-stream transmission to the media client could involve using the at least one steganographically-encoded timestamp in the media stream transmitted to the media client as a basis to determine the transmission delay for media-stream transmission from the content distribution system to the media client.

As further discussed above, the at least one steganographically-encoded timestamp could indicate a reference time at the content distribution system. And in that case, the act of using the at least one steganographically-encoded timestamp in the media stream transmitted to the media client as a basis to determine the transmission delay for media-stream transmission from the content distribution system to the media client could involve (i) decoding the steganographically-encoded timestamp from the media stream to determine the reference time, (ii) determining a current time at the media client, and (iii) comparing the determined current time with the determined reference time to determine the transmission delay.

Figure 6:
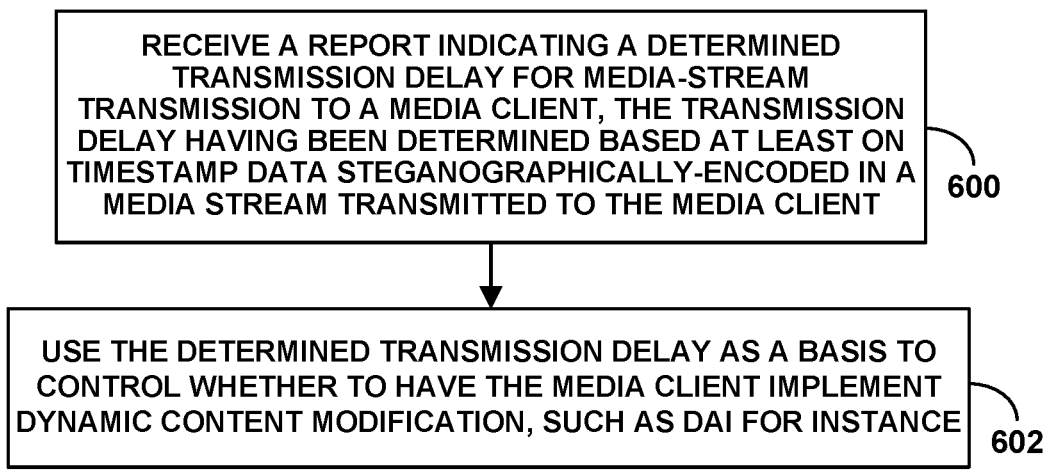
FIG. 6 is another flow chart depicting a method that could be carried out in accordance with the disclosure.

FIG. 6 is next another flow chart depicting a method that can be carried out in accordance with the present disclosure. In an example implementation, this method could be carried out by a computing system, which could be at an ACR server or other entity.

As shown in FIG. 6, at block 600, the method includes receiving a report indicating a determined transmission delay for media-stream transmission to a media client, the transmission delay having been determined based at least on timestamp data steganographically-encoded in a media stream transmitted to the media client. And at block 602, the method includes using the determined transmission delay as a basis to control whether to have the media client implement dynamic content modification, such as DAI for instance.

In line with the discussion above, in this method, the act of using the determined transmission delay as a basis to control whether to have the media client implement dynamic content modification could involve (i) making a determination of whether determined transmission delay is at least as long as a predefined threshold delay, (ii) if the determination is affirmative, then, based at least on the determination, directing the media client to implement dynamic content modification, and (iii) if the determination is negative, then, based at least on the determination, not directing the media client to implement dynamic content modification.

Further, as discussed above, the act of using the determined transmission delay as a basis to control whether to have the media client implement dynamic content modification could involve using the determined transmission delay as a basis to control whether a server engages in processing for directing the media client to implement dynamic content modification. For instance, this could involve using the determined transmission delay as a basis to control whether the server engages in one or more steps such as working to identify a channel being rendered by the media client, working to detect on the channel a presence of a content-modification opportunity, and/or directing the media client to carry out dynamic content modification (e.g., DAI) with respect to the content-modification opportunity.

Figure 7:
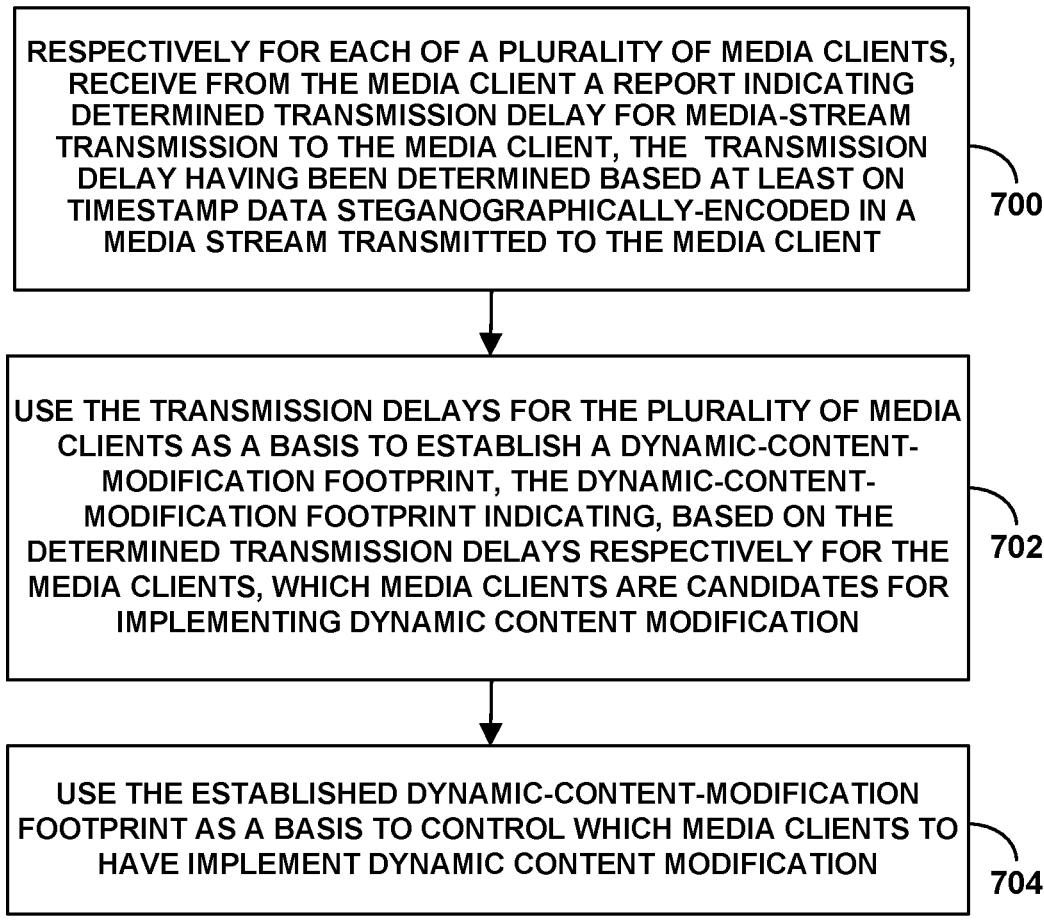
FIG. 7 is another flow chart depicting a method that could be carried out in accordance with the disclosure.

FIG. 7 is next another flow chart depicting a method that can be carried out in accordance with the present disclosure. In an example implementation, this method as well could be carried out by a computing system, which could be at an ACR server or other entity.

As shown in FIG. 7, at block 700, the method includes, respectively for each of a plurality of media clients, receiving from the media client a report indicating determined transmission delay for media-stream transmission to the media client, the transmission delay having been determined based at least on timestamp data steganographically-encoded in a media stream transmitted to the media client. Further, at block 702, the method includes using the transmission delays for the plurality of media clients as a basis to establish a dynamic-content-modification footprint, the dynamic-content-modification footprint indicating, based on the determined transmission delays respectively for the media clients, which media clients are candidates for implementing dynamic content modification. And at block 704, the method includes using the established dynamic-content-modification footprint as a basis to control which media clients to have implement dynamic content modification.

In line with the discussion above, in this method, the act of using the transmission delays for the plurality of media clients to establish the dynamic-content-modification footprint could involve, for each media client (i) making a determination of whether transmission delay determined for the media client is at least as long as a predefined threshold delay, (ii) if the determination is affirmative, then, based at least on the determination, indicating in the dynamic-content-footprint that the media client is a candidate for implementing dynamic content modification, and (iii) if the determination is negative, then, based at least on the determination, not indicating in the dynamic-content-footprint that the media client is a candidate for implementing dynamic content modification.

In line with the discussion above, in this method, the act of using the established dynamic-content-modification footprint as a basis to control which media clients to have implement dynamic content modification could involve (i) identifying based on the established dynamic-content-modification footprint which media clients are candidates for implementing dynamic content modification, and (ii) based on the identifying, engaging in processing for each identified media client to direct the media client to implement dynamic content modification. Further, using the established dynamic-content-modification footprint as a basis to control which media clients to have implement dynamic content modification could additionally involve, based on one or more media clients not being identified as each being a candidate for implementing dynamic content modification, avoiding engaging in processing to direct each of the one or more media clients to implement dynamic content modification.

In addition, as discussed above, the processing could include one or more steps such as (i) working to identify a channel being rendered by the media client, (ii) working to detect on the channel a presence of a content-modification opportunity, and (iii) directing the media client to carry out dynamic content modification with respect to the content-modification opportunity.

Figure 8:
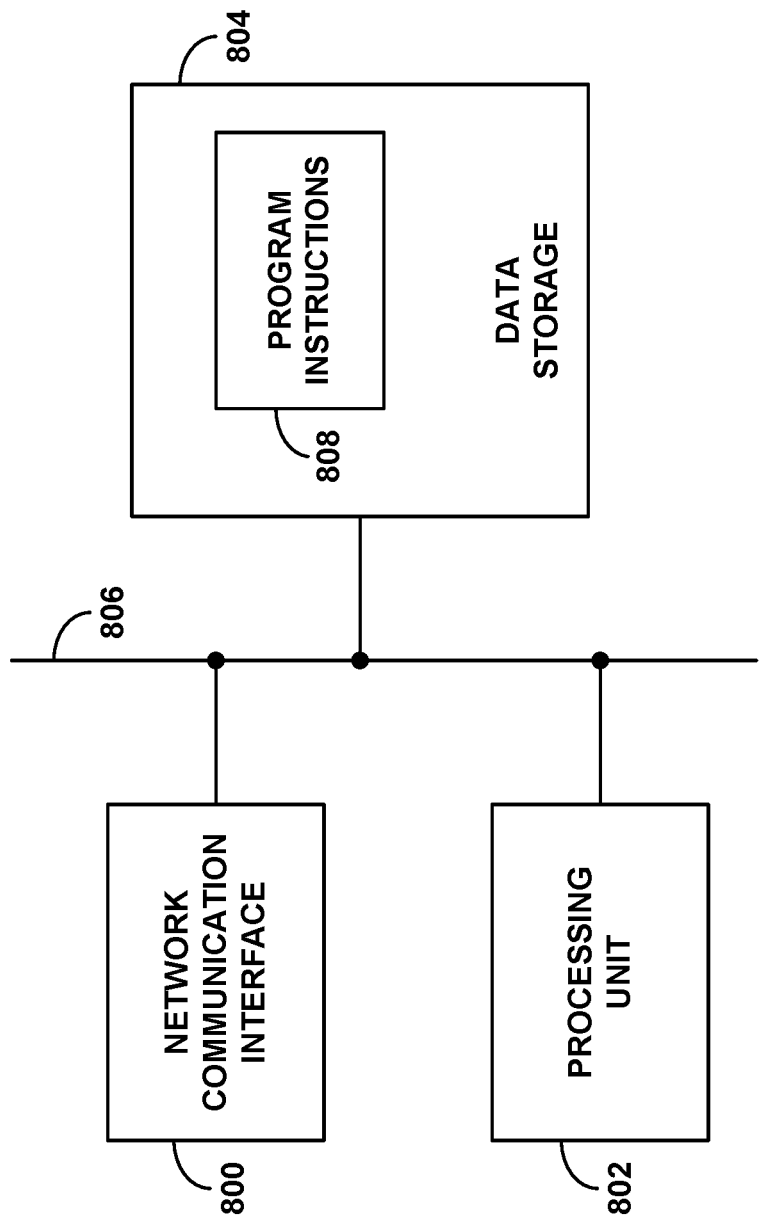
FIG. 8 is a simplified block diagram of an example system that could operate in accordance with the disclosure.

FIG. 8 is next a simplified block diagram of an example system operable in accordance with the present disclosure. This system could represent a computing system, ACR server, content distribution system, content presentation device, and/or one or more other entities or systems described above or otherwise applicable in the context discussed above. As shown in FIG. 8, the example system includes a network communication interface 800, a processing unit 802, and non-transitory data storage 804, any or all of which could be integrated together or, as shown, communicatively linked together by a system bus, network, or other connection mechanism 806.

Network communication interface 800 could comprise one or more physical network connection mechanisms to facilitate communication on a network, and/or for engaging in direct or networked communication with one or more other local or remote entities. As such, the network communication interface could comprise a wireless or wired Ethernet interface, cellular wireless interface, or other type of network interface, for engaging in IP communication and/or other type of network communication.

Processing unit 802, could comprise one or more general purpose processors (e.g., microprocessors) and/or one or more specialized processors (e.g., application specific integrated circuits). And non-transitory data storage 806 could comprise one or more volatile and/or non-volatile storage components, such as optical, magnetic, or flash storage.

As shown, the data storage 804 of the example system stores program instructions 808, which could be executable by processing unit 802 to carry out various operations described herein.

Various features described above could be implemented in this context as well, and vice versa.

Finally, FIG. 9 is a simplified block diagram of an example media client such as a representative content presentation device operable in accordance with the present disclosure. In line with the discussion above, this media client could take various forms. For instance, it could be a television, computer monitor, receiver, or other device that operates to receive and process media content (e.g., video content and/or audio content) for presentation. Numerous other examples are possible as well.

As shown in FIG. 9, the example media client includes a content input interface 900, a content presentation interface 902, a network communication interface 904, a processing unit 906, and non-transitory data storage 908, any or all of which could be integrated together or, as shown, communicatively linked together by a system bus, network, or other connection mechanism 910.

Content input interface 900 could comprise a physical communication interface for receiving media content to be processed for presentation. As such, the content input interface could include one or more wired and/or wireless interfaces for establishing communication with and receiving media content in analog or digital form from a receiver or other device or system. For example, the content input interface could include one or more interfaces compliant with protocols such as DVI, HDMI, VGA, USB, BLUETOOTH, WIFI, among numerous others.

Content presentation interface 902 could then comprise one or more components to facilitate presentation of the received media content if applicable. By way of example, the content presentation interface could comprise a user interface such as a display screen and/or a loudspeaker, as well as one or more drivers or other components for processing the received media content to facilitate presentation of the content on the user interface.

Network communication interface 904 could comprise a physical network connection mechanism to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

Processing unit 906 could then comprise one or more general purpose processors (e.g., microprocessors) and/or one or more specialized processors (e.g., application specific integrated circuits). And non-transitory data storage 908 could comprise one or more volatile and/or non-volatile storage components, such as optical, magnetic, or flash storage. Further, as shown, data storage 908 stores program instructions 912, which could be executable by processing unit 906 to carry out various media-client operations described herein.

Various features described above could be implemented in this context as well, and vice versa.

Further, the present disclosure also contemplates a non-transitory computer readable medium that is encoded with, stores, or otherwise embodies program instructions executable by a processing unit to carry out various operations as described above.

Exemplary embodiments have been described above. Those skilled in the art will understand, however, that changes and modifications may be made to these embodiments without departing from the true scope and spirit of the invention.

What is claimed is:

1. Non-transitory data storage storing program instructions executable by one or more processors to carry out operations comprising:
using at least one steganographically-encoded timestamp in a media stream transmitted to a media client as a basis to determine a transmission delay for media-stream transmission to the media client, and
providing the determined transmission delay as a basis to facilitate control over whether to have the media client implement dynamic content modification.

2. The non-transitory data storage of claim 1, wherein the media stream is transmitted to the media client from a content distribution system, and wherein using the at least one steganographically-encoded timestamp in the media stream transmitted to the media client as a basis to determine the transmission delay for media-stream transmission to the media client comprises:
using the at least one steganographically-encoded timestamp in the media stream transmitted to the media client as a basis to determine the transmission delay for media-stream transmission from the content distribution system to the media client.

3. The non-transitory data storage of claim 2, wherein the at least one steganographically-encoded timestamp indicates a reference time at the content distribution system, and wherein using the at least one steganographically-encoded timestamp in the media stream transmitted to the media client as a basis to determine the transmission delay for media-stream transmission from the content distribution system to the media client comprises:
decoding the steganographically-encoded timestamp from the media stream to determine the reference time;
determining a current time at the media client; and
comparing the determined current time with the determined reference time to determine the transmission delay.

4. The non-transitory data storage of claim 1, wherein the steganographically-encoded timestamp comprises a watermark.

5. The non-transitory data storage of claim 4, wherein the media stream represents audio, and wherein watermark is an audio watermark.

6. The non-transitory data storage of claim 1, wherein the dynamic content modification comprises dynamic ad insertion.

7. The non-transitory data storage of claim 1, wherein the media client comprises a content presentation device.

8. Non-transitory data storage storing program instructions executable by one or more processors to carry out operations comprising:
receiving a report indicating a determined transmission delay for media-stream transmission to a media client, wherein transmission delay is determined based at least on timestamp data steganographically-encoded in a media stream transmitted to the media client, and
using the determined transmission delay as a basis to control whether to have the media client implement dynamic content modification.

9. The non-transitory data storage of claim 8, wherein using the determined transmission delay as a basis to control whether to have the media client implement dynamic content modification comprises using the determined transmission delay as a basis to control whether a server engages in processing for directing the media client to implement dynamic content modification.

10. The non-transitory data storage of claim 9, wherein the processing comprises at least one step selected from the group consisting of:
working to identify a channel being rendered by the media client,
working to detect on the channel a presence of a content-modification opportunity, and
directing the media client to carry out dynamic content modification with respect to the content-modification opportunity.

11. The non-transitory data storage of claim 8, wherein the dynamic content modification comprises dynamic ad insertion.

12. The non-transitory data storage of claim 8, wherein the media stream is transmitted to the media client from a content distribution system, and wherein the transmission delay is transmission delay from the content distribution system to the media client.

13. Non-transitory data storage storing program instructions executable by one or more processors to carry out operations comprising:
respectively for each of a plurality of media clients, receiving from the media client a report indicating determined transmission delay for media-stream transmission to the media client, wherein transmission delay is determined based at least on timestamp data steganographically-encoded in a media stream transmitted to the media client; and using the transmission delays for the plurality of media clients to establish a dynamic-content-modification footprint, wherein the dynamic-content-modification footprint indicates which media clients are candidates for implementing dynamic content modification, based on the determined transmission delays respectively for the media clients.

14. The non-transitory data storage of claim 13, wherein the plurality of media clients includes a first media client and a second media client, and wherein using the transmission delays for the plurality of media clients to establish a dynamic-content-modification footprint comprises:
   determining that the first media client is a candidate for implementing dynamic content modification, based on the determined transmission delay for media-stream transmission to the first media client; and
   determining that the second media client is not a candidate for implementing dynamic content modification, based on the determined transmission delay for media-stream transmission to the second media client.

15. The non-transitory data storage of claim 13, wherein the operations further include:
   using the established dynamic-content-modification footprint as a basis to control which media clients to have implement dynamic content modification.

16. The non-transitory data storage of claim 15, wherein using the established dynamic-content-modification footprint as a basis to control which media clients to have implement dynamic content modification comprises:
   identifying based on the established dynamic-content-modification footprint which media clients are candidates for implementing dynamic content modification; and
   based on the identifying, engaging in processing for each identified media client to direct the media client to implement dynamic content modification.

17. The non-transitory data storage of claim 16, wherein the processing comprises at least one step selected from the group consisting of:
   working to identify a channel being rendered by the media client,
   working to detect on the channel a presence of a content-modification opportunity, and
   directing the media client to carry out dynamic content modification with respect to the content-modification opportunity.

18. The non-transitory data storage of claim 16, wherein using the established dynamic-content-modification footprint as a basis to control which media clients to have implement dynamic content modification further comprises:
   based on one or more media clients not being identified as each being a candidate for implementing dynamic content modification, avoiding engaging in processing to direct each of the one or more media clients to implement dynamic content modification.

19. The non-transitory data storage of claim 18, wherein the processing comprises at least one step selected from the group consisting of:
   working to identify a channel being rendered by the media client,
   working to detect on the channel a presence of a content-modification opportunity, and
   directing the media client to carry out dynamic content modification with respect to the content-modification opportunity.

20. The non-transitory data storage of claim 13, wherein the dynamic content modification comprises dynamic ad insertion.

* * * * *